United States Patent Office
3,336,340
Patented Aug. 15, 1967

3,336,340
BENZOPYRANS AND PROCESS FOR THE
PREPARATION THEREOF
Louis R. Freimiller, Philadelphia, Pa., assignor to Rohm
& Haas Company, Philadelphia, Pa., a corporation of
Delaware
No Drawing. Filed Nov. 29, 1963, Ser. No. 327,043
14 Claims. (Cl. 260—345.3)

This invention concerns a process for the self-condensation of 2-methylolcyclehexanone and the products produced thereby. More particularly, it concerns the reaction of 2-methylolcyclohexanone in the presence of an acid catalyst to produce polycyclic oxygen-containing heterocycles.

The reaction product consists of a mixture of two heterocyclic compounds, one a solid of the formula hereinafter designated "Solid A," and the other a liquid of the formula hereinafter designated "Liquid B":

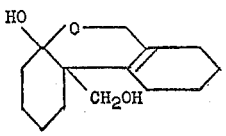

SOLID A

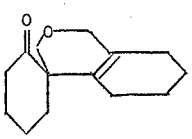

LIQUID B

Whereas the two different compounds are present in the original reaction mixture, Solid A can be converted quantitatively to Liquid B by treatment of the solid in a solvent with an acid catalyst. Thus, it is possible to convert the original reaction mixture completely to Liquid B.

Liquid B has proven to be an excellent plasticizer for polyvinyl chloride and polyacrylate resins as set forth hereinafter. Solid A, although produced initially in the reaction mixture as set forth hereinbefore, can serve as a precursor for Liquid B which, as set forth hereinbefore, is an excellent plasticizer for polyvinyl chloride and other plastics.

The preparation of 2-methylolcyclohexanone has been reported several times in the literature, one reference being Chemical Abstracts, 44, 6386i. It can readily be prepared from formaldehyde and cyclohexanone.

The self-condensation of 2-methylolcyclohexanone is preferably carried out in a solvent, and typical solvents are benzene, toluene, xylene and similar aromatic hydrocarbons, hexane, heptane and octane. The saturated aliphatic hydrocarbons are not solvents for 2-methylolcyclohexanone, but the reaction will take place therein. Mixtures of aliphatic hydrocarbons and aromatic hydrocarbons are preferred to aliphatic hydrocarbons alone.

Other solvents which are inert under the reaction conditions can also be used. The solutions can contain from 10% to 60% 2-methylolcyclohexanone. Preferred concentrations are from 20% to 50%.

Acidic catalysts which promote condensation with loss of water are well-known and can be employed for the self-condensation of 2-methylolcyclohexanone. However, particularly preferred catalysts are the dehydrated acid forms of macroreticular-structured sulfonic cation exchangers. These products, while representing a relatively new development, are rapidly becoming known to those skilled in the art, and they are described in detail in U.S. Patent 3,037,052. They are characterized by having a true macroporosity, as contrasted with the so-called "porosity" of the conventional gel type sulfonic cation exchangers, and this macroporosity results in a high specific surface value. Furthermore, it has been found that the specific surface is directly proportional to the amount of cross-linking agent employed and thus relatively high levels of cross-linking are preferred. Particularly preferred resins are those prepared by sulfonating styrene-divinylbenzene copolymers, which copolymers have been prepared in the presence of a material which is a solvent for the monomer mixture, but which neither swells nor is imbibed by the copolymer so formed. As indicated, complete details are set forth in U.S. 3,037,052 and a detailed preparation is also set forth therein. The divinylbenzene content of copolymer can be from 8 to 50% with the range 20% to 50% representing the preferred embodiment.

When employing these dehydrated acid form macroreticular-structured copolymers as catalysts in the self-condensation with 2-methylolcyclohexanone, they are employed at 1% by weight to 25% by weight, based on the weight of the 2-methylolcyclohexanone.

Liquid B is an effective plasticizer for numerous polymers. Typical are the tests which were conducted on poly(methyl methacrylate), molecular weight 80,000 to 120,000, and on a polyvinyl chloride copolymer (95% polyvinyl chloride, 5% polyvinyl acetate). 0.5 grams of Liquid B was dissolved in 3.9 grams of a 30% solution of poly(methyl methacrylate) having a molecular weight of 80,000 to 120,000. The films were drawn out on glass plates. Before baking, the film was clear, well-plasticized and very rubbery. The Knoop hardness was too low to be measured accurately. After baking for one hour at 150° C., the film was clear, well-plasticized and slightly rubbery with a Knoop hardness value of 7.75. As a plasticizer for poly(methyl methacrylate) Liquid B exhibited excellent compatibility and high efficiency.

0.5 gram of Liquid B was dissolved in 3.7 grams of a 20% methyl isobutyl ketone solution of Vinylite VYHH (a copolymer of 95% polyvinyl chloride and 5% polyvinyl acetate). This solution was coated onto glass plates and air-dried overnight. The air-dried film was clear and had good softness and flexibility. The film was then baked for thirty minutes at 150° C. to remove any residual solvents, but no detractable change in film properties was noted. Liquid B exhibited excellent compatibility with polyvinyl chloride, was an efficient plasticizer therefor.

EXAMPLE I

Self-condensation of 2-methylolcyclohexanone

A mixture of 256 grams (2 moles) of 2-methylolcyclohexanone, 25.6 grams of Amberlyst 15 and 600 ml. of benzene was stirred in a 2 liter, three-necked flask which was attached to a Stark-Dean trap and a reflux condenser. This mixture was heated to reflux for nineteen minutes while 19 ml. of water were collected in the trap. It was next cooled to about 50° C. and filtered by suction. The catalyst was washed with 135 ml. of benzene. The combined filtrate was placed under a vacuum of 120 mm. and 422 ml. of benzene stripped off. The residue stood overnight and Solid A crystallized out. The solid was collected by suction filtration and dried. A second small crop of crystals was obtained by diluting the filtrate with 200 ml. of hexane. The total yield of Solid A=67.2 grams (31.1%). Melting point=129.5° to 140.5°.

Calculated for $C_{14}H_{22}O_3$: C, 70.54%; H, 9.32%. Found: C, 70.46%; H, 9.3%.

EXAMPLE II

Conversion of solid A to liquid B 47.6 grams of Solid A was dissolved in 150 ml. of benzene and 5.1 grams of the dehydrated acid form of a macroreticular-structured sulfonic acid cation exchange resin was added thereto. This resin was prepared by sulfonating a macroreticular-structured copolymer of styrene and divinylbenzene containing about 20% divinylbenzene by weight based on the total weight of the monomers. As indicated, it has a macroreticular structure, said macroreticular structure having been discussed in detail hereinbefore. The mixture was refluxed with stirring for two hours (temperature approximately 85° C.) and the water which was formed (3.6 ml.) was removed by azeotroping. The mixture was filtered while still warm and the catalyst was washed with benzene. Benzene was stripped at 100 mm. to a temperature of 76° C. The residue was distilled under reduced pressure and the following cuts made:

| Cut | Head Temperature, deg. | Pot Temperature, deg. | Pressure | Weight | $n_D^{20}$ |
|---|---|---|---|---|---|
| 1 | 94–104 | 115–119 | .24–.35 | 19.5 | 1.5103 |
| 2 | 99–113 | 118–150 | .18–.20 | 12.9 | 1.5104 |
| Residue | | | | 8.1 | 1.5001 |

Weight of Liquid B=19.5+12.9 for a total of 32.4 g. (73.7%).

Calculated for $C_{14}H_{20}O_2$: C, 76.31%; H, 9.17%. Found: C, 76.33%; H, 9.28%.

I claim:

1. Process for the preparation of oxygen-containing heterocycles which comprises reacting 2-methylolcyclohexanone in the presence of an acid catalyst.

2. Process as set forth in claim 1 in which the 2-methylolcyclohexanone is dissolved in a solvent selected from the group consisting of benzene, toluene, xylene and mixtures of said aromatic hydrocarbons with aliphatic hydrocarbons selected from the group consisting of hexane, heptane and octane.

3. Process as set forth in claim 1 in which the reaction temperature is from 75° to 100° C.

4. Process as set forth in claim 1 in which the acid catalyst is the dehydrated acid form of a macroreticular-structured sulfonic acid cation exchanger.

5. Process as set forth in claim 4 in which the macroreticular-structured cation exchange resin is a sulfonated copolymer of styrene and divinylbenzene.

6. Process as set forth in claim 5 in which the macroreticular-structured sulfonated styrene-divinylbenzene copolymer contains from 8 to 50% divinylbenzene by weight based on the weight of the monomer mixture.

7. Process as set forth in claim 5 in which the macroreticular-structured sulfonated styrene-divinylbenzene copolymer contains from 20 to 50% divinylbenzene by weight based on the weight of the monomer mixture.

8. Process for the conversion of Solid A to Liquid B which comprises heating Solid A or a solvent solution thereof in the presence of the dehydrated acid-form of a macroreticular-structured sulfonic acid cation exchange resin.

9. Process as set forth in claim 8 in which the solvent is selected from the group consisting of benzene, toluene, xylene, and mixtures of said aromatic hydrocarbons with aliphatic hydrocarbons selected from the group consisting of hexane, heptane and octane.

10. Process as set forth in claim 8 in which the macroreticular-structured sulfonic acid cation exchange resin is a sulfonated copolymer of styrene-divinylbenzene.

11. Process as set forth in claim 10 in which the divinylbenzene content is from 8 to 50% by weight based on the weight of the total monomer mixture.

12. Process as set forth in claim 10 in which the divinylbenzene content is from 20 to 50% by weight based on the weight of the total monomer mixture.

13. A compound of the structure

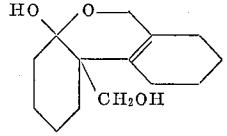

14. A compound of the structure

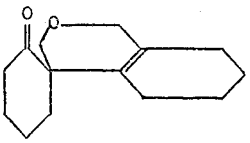

References Cited

UNITED STATES PATENTS

| | | | |
|---|---|---|---|
| 2,419,935 | 5/1947 | Adams | 260—345.3 |
| 2,509,386 | 5/1950 | Adams | 260—345.3 |

WALTER A. MODANCE, *Primary Examiner.*

J. M. FORD, *Assistant Examiner.*